United States Patent
Okamoto et al.

(10) Patent No.: US 10,227,012 B2
(45) Date of Patent: Mar. 12, 2019

(54) BRAKE CONTROL DEVICE OF RAILCAR

(71) Applicant: KAWASAKI JUKOGYO KABUSHIKI KAISHA, Kobe-shi, Hyogo (JP)

(72) Inventors: Takafumi Okamoto, Kobe (JP); Yuta Yoshimatsu, Kobe (JP); Takeshi Morimoto, Kobe (JP); Katsuya Ihara, Kobe (JP); Hiroaki Kagaya, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/554,073

(22) PCT Filed: Feb. 18, 2016

(86) PCT No.: PCT/JP2016/000873
§ 371 (c)(1),
(2) Date: Aug. 28, 2017

(87) PCT Pub. No.: WO2016/136216
PCT Pub. Date: Sep. 1, 2016

(65) Prior Publication Data
US 2018/0037120 A1    Feb. 8, 2018

(30) Foreign Application Priority Data

Feb. 26, 2015    (JP) ................ 2015-036322

(51) Int. Cl.
*B60L 7/24*    (2006.01)
*B60L 7/26*    (2006.01)
(Continued)

(52) U.S. Cl.
CPC ............. *B60L 7/26* (2013.01); *B60L 7/24* (2013.01); *B60L 15/20* (2013.01);
(Continued)

(58) Field of Classification Search
CPC .... B60L 7/24; B60L 7/26; B60L 15/20; B60L 15/2009; B60L 2200/26; B60L 2200/461;
(Continued)

(56) References Cited

U.S. PATENT DOCUMENTS 4,225,813 A * 9/1980 Sahasrabudhe ........... B60L 7/26
                                                       318/371
4,671,576 A * 6/1987 Fourie ................... B60T 8/1705
                                                       188/156

FOREIGN PATENT DOCUMENTS

JP    H07-7806 A    1/1995
JP    H11-103508 A  4/1999
(Continued)

OTHER PUBLICATIONS

May 17, 2016 International Search Report issued in International Patent Application No. PCT/JP2016/000873.
(Continued)

*Primary Examiner* — Aaron L Troost
(74) *Attorney, Agent, or Firm* — Oliff PLC (57) ABSTRACT

A brake control device of a railcar includes: a brake switching portion configured to perform switching from an operation of an electric brake device to an operation of a mechanical brake device when a switching monitoring speed obtained from a wheelset speed becomes less than a switching threshold; and an adhesion control portion configured to, when the brake switching portion performs the switching, control at least one of the electric brake device and the brake switching portion to cause a wheel to adhere to a rail.

6 Claims, 8 Drawing Sheets

(51) Int. Cl.
*B60T 8/17* (2006.01)
*B60L 15/20* (2006.01)
*B60T 8/1761* (2006.01)

(52) U.S. Cl.
CPC ............ *B60L 15/2009* (2013.01); *B60T 8/17* (2013.01); *B60T 8/1705* (2013.01); *B60T 8/1761* (2013.01); *B60T 8/17616* (2013.01); *B60L 2200/26* (2013.01); *B60L 2240/461* (2013.01); *B60L 2240/465* (2013.01); *Y02T 10/7275* (2013.01)

(58) Field of Classification Search
CPC .... B60L 2200/465; B60T 8/17; B60T 8/1705; B60T 8/1761; B60T 8/17616; Y02T 10/7275
See application file for complete search history.

(56) References Cited

FOREIGN PATENT DOCUMENTS

| | | |
|---|---|---|
| JP | 2001-341625 A | 12/2001 |
| JP | 2005-033902 A | 2/2005 |
| JP | 2014-117147 A | 6/2014 |

OTHER PUBLICATIONS

Aug. 29, 2017 International Preliminary Report on Patentability issued in International Patent Application No. PCT/JP2016/000873.

* cited by examiner

BRAKE CONTROL DEVICE OF RAILCAR

TECHNICAL FIELD

The present invention relates to a brake control device configured to control an electric brake device and mechanical brake device of a railcar.

BACKGROUND ART

PTL 1 discloses a brake system of a railcar. The brake system of PTL 1 includes: an electric brake device configured to cause an electric motor that is a driving power source to serve as a power generator to brake a wheel; and an air brake device configured to cause a brake shoe or the like to drive by air pressure to brake the wheel by friction. When a travelling speed of the railcar decreases to a low speed range while the electric brake device is operating, the brake system of PTL 1 performs switching from the operation of the electric brake device to the operation of the air brake device.

CITATION LIST

Patent Literature

PTL 1: Japanese Laid-Open Patent Application Publication No. 7-7806

SUMMARY OF INVENTION

Technical Problem

When performing the switching from the operation of the electric brake device to the operation of the air brake device, an electric brake and an air brake slightly overlap such that braking force is prevented from being interrupted. Therefore, there is a moment at which both the braking force by the electric brake and the braking force by the air brake act. On this account, there is a possibility that when switching from the electric brake to the air brake, the entire braking force becomes excessive. Especially when a friction coefficient between a wheel and a rail is small, and the degree of slip is large at the time of brake switching, there is a possibility that: the slip steeply increases by the excessive braking force; a braking distance increases; and the wheel is locked.

An object of the present invention is to provide a brake control device of a railcar, the brake control device being configured to prevent slip by brake switching from increasing, suppress wheel lock, and shorten a braking distance.

Solution to Problem

A brake control device of a railcar according to one aspect of the present invention is a device configured to control an electric brake device and mechanical brake device of the railcar, and the brake control device includes: a brake switching portion configured to perform switching from an operation of the electric brake device to an operation of the mechanical brake device when a switching monitoring speed obtained from a wheelset speed becomes less than a switching threshold; and an adhesion control portion configured to, when the brake switching portion performs the switching, control at least one of the electric brake device and the brake switching portion to cause a wheel to adhere to a rail.

According to the above configuration, when the brake switching portion performs the switching, the wheel is caused to adhere to the rail. Therefore, a case where slip is promoted by the switching from the operation of the electric brake device to the operation of the mechanical brake device is prevented. On this account, an increase in the slip by brake switching can be prevented, wheel lock can be suppressed, and a braking distance can be shortened.

Advantageous Effects of Invention

According to the brake control device of the railcar of the present invention, the increase in the slip by the brake switching can be prevented, the wheel lock can be suppressed, and the braking distance can be shortened.

DESCRIPTION OF EMBODIMENTS

Hereinafter, embodiments will be explained in reference to the drawings.

Embodiment 1

Figure 1:
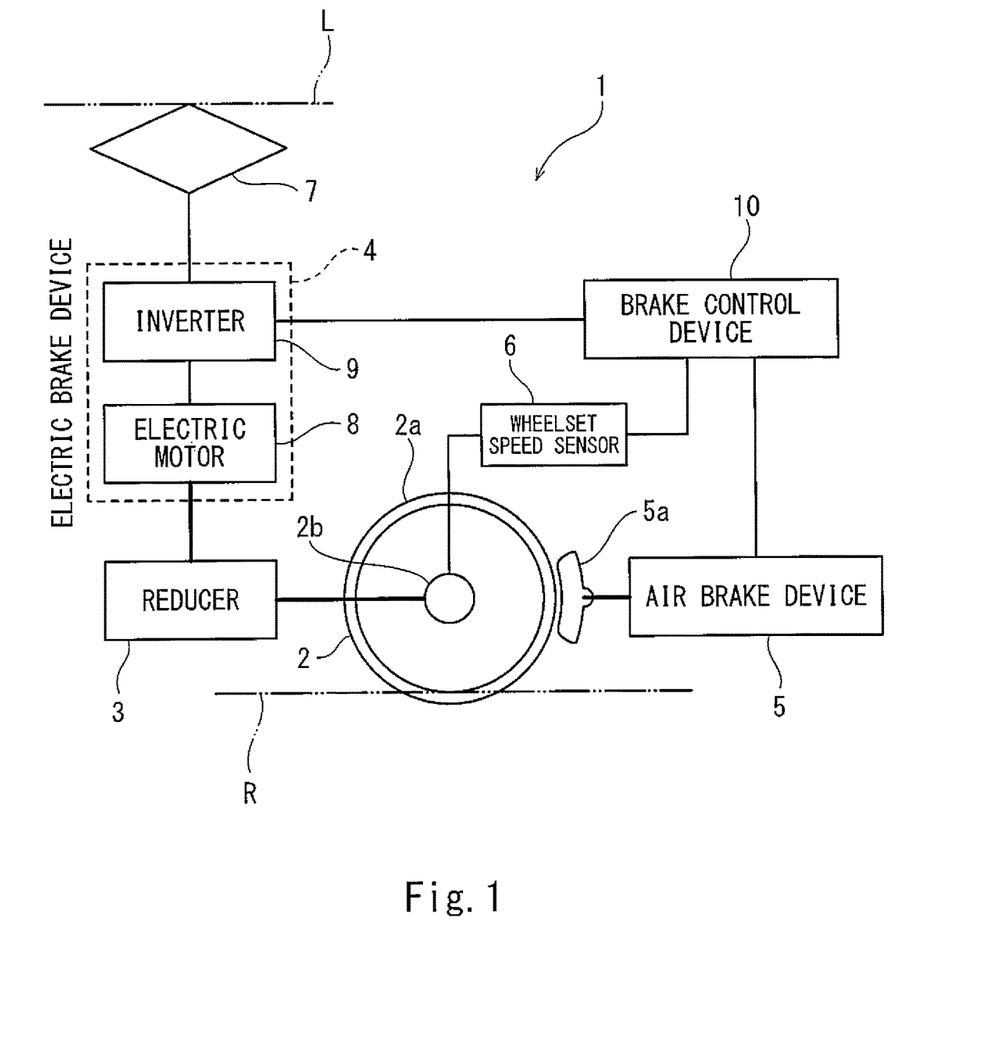
FIG. 1 is a schematic diagram showing a railcar including a brake control device according to Embodiment 1.

FIG. 1 is a schematic diagram showing a railcar 1 including a brake control device 10 according to Embodiment 1. As shown in FIG. 1, the railcar 1 includes a wheelset 2, a reducer 3, an electric brake device 4, an air brake device 5, a wheelset speed sensor 6, a pantograph 7, and the brake control device 10. A plurality of wheelsets 2 are provided at the railcar 1. Each of the wheelsets 2 includes: a pair of wheels 2a rolling on rails R by frictional force; and an axle 2b fixed to the pair of wheels 2a. The reducer 3 is connected to the axle 2b so as to be able to transmit power to the axle 2b. The electric brake device 4 is connected to the reducer 3 so as to be able to transmit power to the reducer 3. The electric brake device 4 includes: an electric motor 8 connected to the reducer 3 so as to be able to transmit power to the reducer 3; and an inverter 9 configured to control the electric motor 8.

At the time of an electric brake, the inverter 9 causes the electric motor 8 to serve as a power generator and causes the electric motor 8 to generate electric power by rotation inertia force of the wheelset 2, the rotation inertia force being transmitted from the axle 2b through the reducer 3 to the electric motor 8. With this, braking torque is applied to the wheelset 2. To be specific, the electric brake device 4 is a brake configured to convert a rotational movement energy of the wheelset 2 into an electric energy to decelerate the wheelset 2 and is a concept including an electric power generating brake and a regenerative brake. When the railcar accelerates, the inverter 9 causes the electric motor 8 to generate rotational driving force by electric power collected from an overhead contact line L through the pantograph 7, and the rotational driving force is transmitted through the reducer 3 to the axle 2b.

The air brake device 5 is one example of a mechanical brake device. A mechanical brake is a brake that mechanically and frictionally brakes the wheelset 2 by driving force (such as air pressure or electromotive force) and is a concept including a wheel tread brake and a disc brake. The air brake device 5 presses a brake shoe 5a against a wheel tread of the wheel 2a by a driving source that is the air pressure from a compressor (not shown) to apply braking pressure to the wheelset 2. When the brake control device 10 receives a braking command from a driver, the brake control device 10 controls the electric brake device 4 and the air brake device 5 while referring to a signal from the wheelset speed sensor 6. It should be noted that: a plurality of electric brake devices 4, a plurality of air brake devices 5, and a plurality of wheelset speed sensors 6 are provided such that one set of the electric brake device 4, the air brake device 5, and the wheelset speed sensor 6 corresponds to one wheelset 2; and these electric brake devices 4, air brake devices 5, and wheelset speed sensors 6 are connected to one brake control device 10. Further, the brake control device 10 may be configured such that a device configured to control the electric brake devices 4 and a device configured to control the air brake devices 5 are connected to each other so as to be able to communicate with each other.

Figure 2:
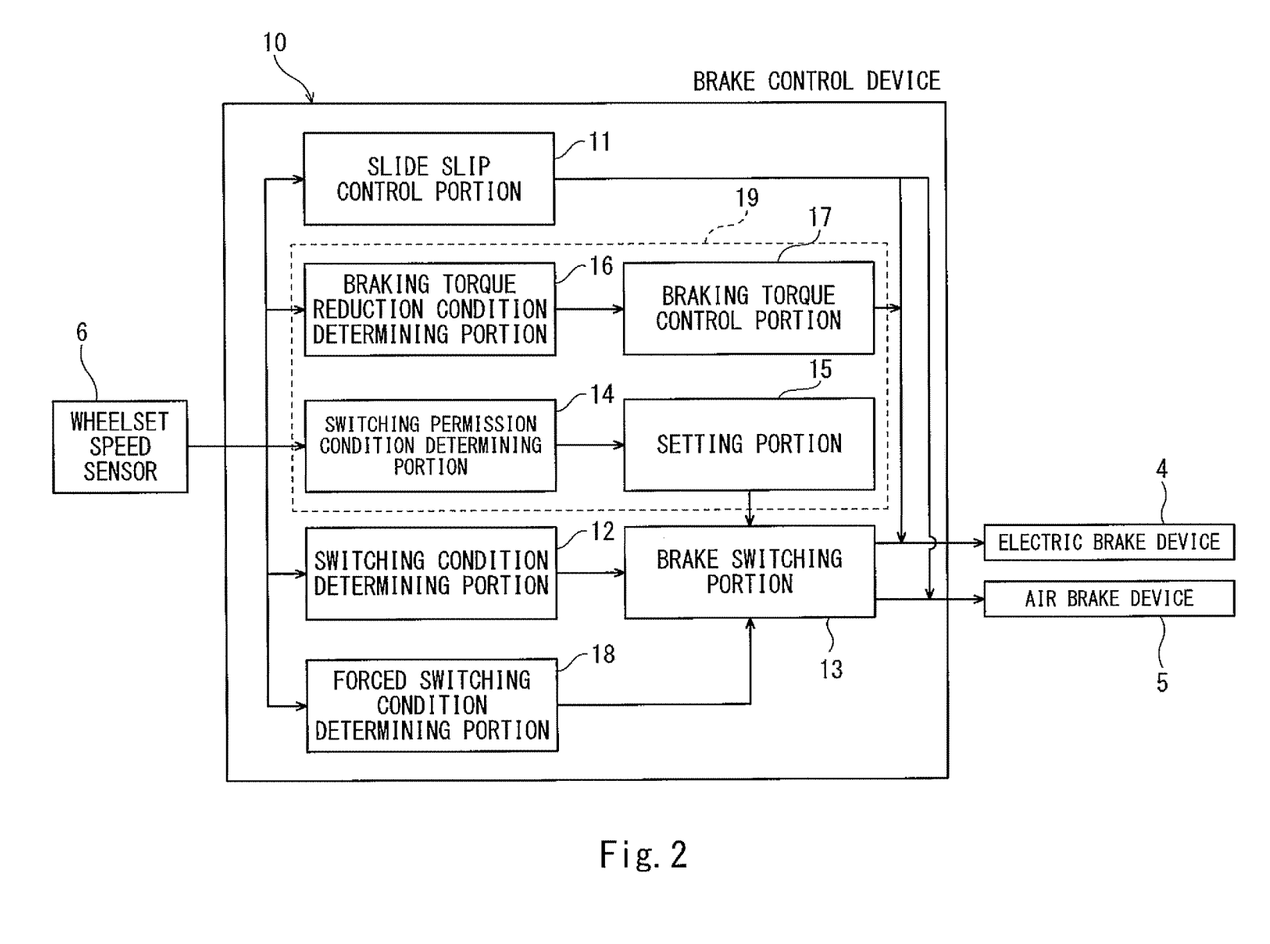
FIG. 2 is a block diagram of the brake control device shown in FIG. 1.

FIG. 2 is a block diagram of the brake control device 10 shown in FIG. 1. As shown in FIG. 2, the brake control device 10 includes a slide slip control portion 11, a switching condition determining portion 12, a brake switching portion 13, a switching permission condition determining portion 14, a setting portion 15, a braking torque reduction condition determining portion 16, a braking torque control portion 17, and a forced switching condition determining portion 18. The switching permission condition determining portion 14, the setting portion 15, the braking torque reduction condition determining portion 16, and the braking torque control portion 17 constitute an adhesion control portion 19. For example, when a below-described slip degree SL1 exceeds a predetermined slip threshold SH, the slide slip control portion 11 starts a braking force reducing control operation of reducing the braking force of the electric brake device 4 or the braking force of the air brake device 5. When the slip degree SL1 becomes less than a slip threshold SH1, the slide slip control portion 11 terminates the braking force reducing control operation (for example, SH≥SH1). It should be noted that the control operation by the slide slip control portion 11 may be a control operation described in, for example, Japanese Laid-Open Patent Application Publication No. 2014-117147.

The switching condition determining portion 12 determines whether or not a switching condition that a switching monitoring speed obtained from a wheelset speed is less than a predetermined switching threshold P3 is being established. Specifically, the switching condition determining portion 12 determines whether or not a switching condition that a wheelset speed V (switching monitoring speed) of the wheelset 2 whose wheelset speed (a product of a rotation angle speed and a wheel radius) is the highest among the plurality of wheelsets 2 is less than the switching threshold P3 is being established. When the switching condition determining portion 12 determines that the switching condition is being established while the electric brake device 4 is operating, the brake switching portion 13 performs switching from the operation of the electric brake device 4 to the operation of the air brake device 5.

The switching permission condition determining portion 14 determines whether or not a switching permission condition is being established. The switching permission condition includes: a first condition that the wheel 2a is in a predetermined adhesion state with respect to the rail; and a second condition that a value VD obtained by subtracting the switching threshold P3 from the wheelset speed V when the first condition is being established is less than a predetermined permission threshold P2. When the switching permission condition determining portion 14 determines that the switching permission condition is being established, the setting portion 15 sets a permitting state of permitting the switching performed by the brake switching portion 13 when the switching condition is being established. When the switching permission condition determining portion 14 determines that the switching permission condition is not being established, the setting portion 15 sets a not-permitting state of not permitting the switching performed by the brake switching portion 13 when the switching condition is being established.

The braking torque reduction condition determining portion 16 determines whether or not a braking torque reduction condition that the wheelset speed V is less than a predetermined braking torque reduction threshold P1 that is larger than the switching threshold P3 is being established. When the braking torque reduction condition determining portion 16 determines that the braking torque reduction condition is being established, the braking torque control portion 17 reduces the braking torque of the electric brake device 4. To be specific, the adhesion control portion 19 controls the electric brake device 4 and the brake switching portion 13 such that the wheel 2a adheres to the rail R at the time of the switching performed by the brake switching portion 13 when the switching condition is being established.

The forced switching condition determining portion 18 determines whether or not a forced switching condition that the wheelset speed V is less than a predetermined forced switching threshold P4 that is smaller than the switching threshold P3 is being established. When the forced switching condition determining portion 18 determines that the forced switching condition is being established, the brake switching portion 13 forcibly performs the switching from the operation of the electric brake device 4 to the operation of the air brake device 5 even in a case where the not-permitting state is being set by the setting portion 15.

Figure 3:
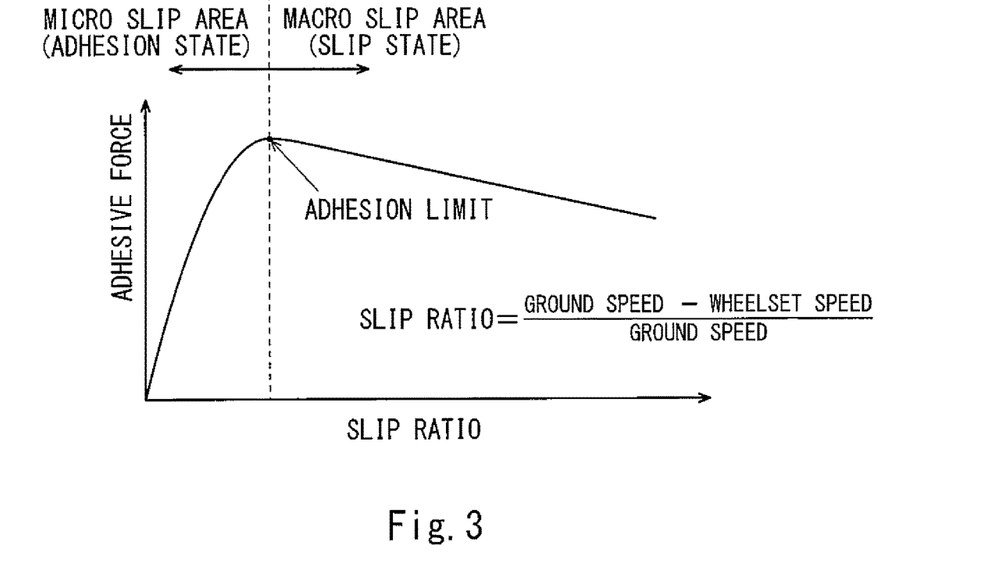
FIG. 3 is a graph for explaining a relation between a slip ratio and adhesive force.

FIG. 3 is a graph for explaining a relation between a slip ratio and adhesive force. As shown in FIG. 3, the slip ratio that is one example of the slip degree is defined as a value obtained by dividing a value, obtained by subtracting the wheelset speed from a ground speed (railcar speed), by the ground speed. The adhesive force denotes frictional force acting between the wheel and the rail. The adhesive force increases as the slip ratio increases from zero. Then, the adhesive force starts decreasing when the slip ratio exceeds a certain limit. A point where the adhesive force becomes the largest is called an adhesion limit. A region where the slip ratio is smaller than the adhesion limit is called a micro slip area (adhesion state), and a region where the slip ratio is larger than the adhesion limit is called a macro slip area (slip state).

When the slip ratio is in the micro slip area, the adhesive force is mainly static frictional force. Even when the slip ratio increases, the adhesive force increases until the adhesion limit. However, when the slip ratio enters into the macro slip area, the adhesive force mainly becomes dynamic frictional force. As the slip ratio increases, the adhesive force decreases, and this causes slip. Therefore, it is desirable that when a sudden phenomenon that may cause the slip occurs, the slip ratio be in the vicinity of the adhesion limit, preferably in the micro slip area. It should be noted that the railcar 1 of the present embodiment is not provided with a device configured to acquire an actual ground speed. Therefore, to calculate the slip ratio, the ground speed needs to be estimated from the wheelset speed V.

Figure 4:
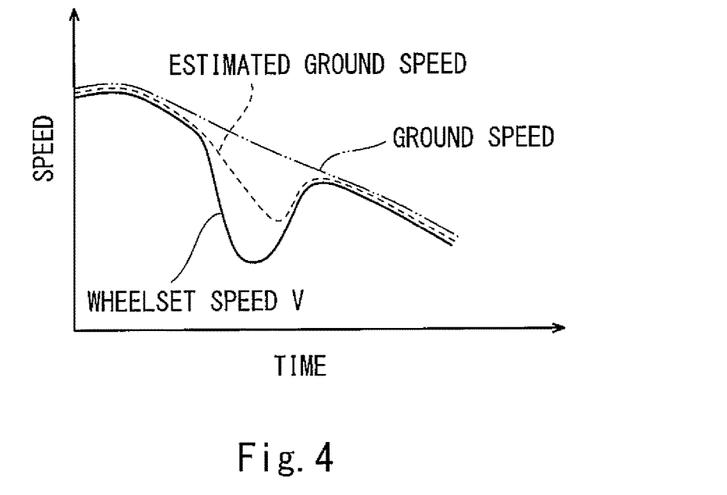
FIG. 4 is a graph for explaining an estimated ground speed.

FIG. 4 is a graph for explaining the estimated ground speed. In FIG. 4, a solid line indicates the wheelset speed V of the wheelset 2 whose wheelset speed is the highest among the plurality of wheelsets 2 of the railcar 1, a broken line indicates the estimated ground speed estimated from the wheelset speed V, and a two-dot chain line indicates the actual ground speed. Specifically, when deceleration of the wheelset speed V exceeds a predetermined limit value (i.e., when the wheelset 2 suddenly decelerates), a speed value interpolated by using the deceleration immediately before the wheelset speed exceeds the limit value is used as the estimated ground speed instead of the wheelset speed V. When the deceleration of the wheelset speed V becomes less than the limit value, the wheelset speed V itself is used as the estimated ground speed. Therefore, an influence of a fluctuation of the wheelset speed V by the slip remains in the estimated ground speed, and the fluctuation of the estimated ground speed is larger than the fluctuation of the actual ground speed.

Figure 5:
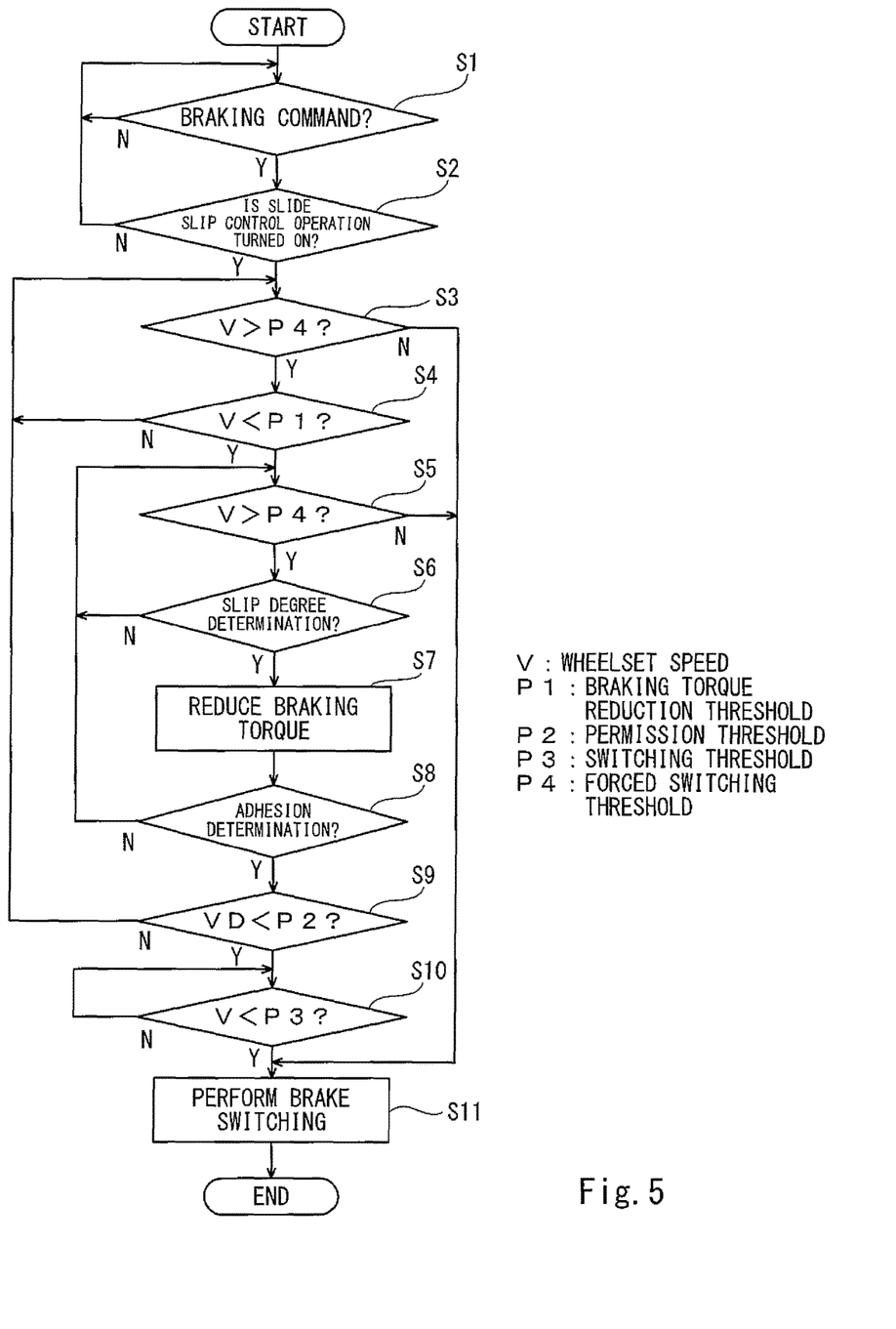
FIG. 5 is a flow chart for explaining a control operation of the brake control device shown in FIG. 1.
Figure 6:
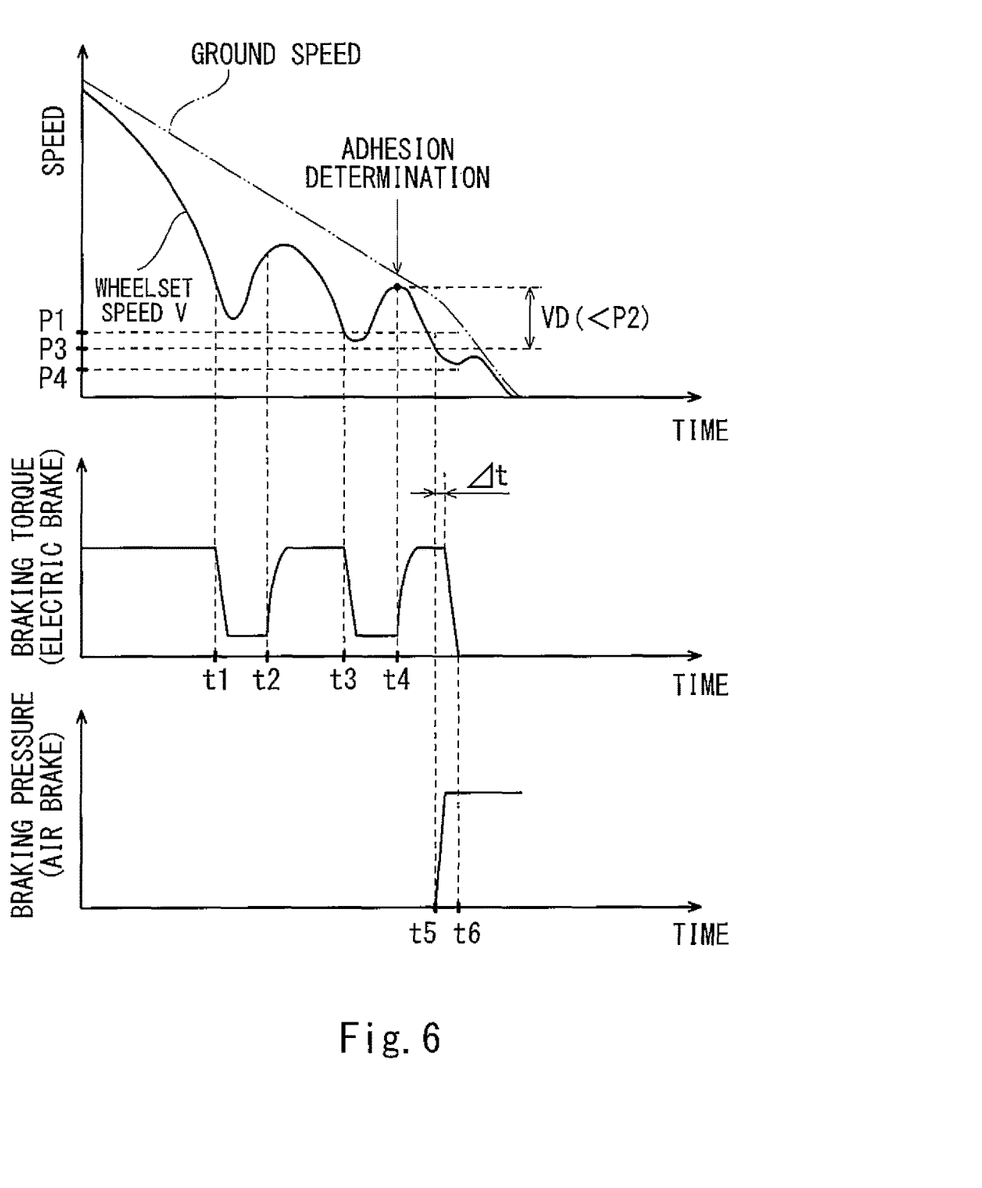
FIG. 6 shows timing charts of a wheelset speed, braking torque of an electric brake, and braking pressure of an air brake at the time of the control operation of the brake control device shown in FIG. 1.

FIG. 5 is a flow chart for explaining a control operation of the brake control device 10 shown in FIG. 1. FIG. 6 shows timing charts of the wheelset speed V, the braking torque of the electric brake, and the braking pressure of the air brake at the time of the control operation of the brake control device 10 shown in FIG. 1. In FIG. 6, a solid line indicates the wheelset speed V (switching monitoring speed) of the wheelset 2 whose wheelset speed is the highest among the plurality of wheelsets 2, and a two-dot chain line indicates the actual ground speed. Hereinafter, control details of the brake control device 10 will be explained based on the flow chart of FIG. 5 while referring to FIGS. 2 and 6.

The brake control device 10 determines whether or not the braking command from the driver is being received (Step S1). When it is determined that the braking command is not being received, the process returns to Step S1. When it is determined that the braking command is being received, the brake control device 10 determines whether or not a slide slip control operation performed by the slide slip control portion 11 is being turned on (Step S2). When it is determined that the slide slip control operation is not being turned on, the process returns to Step S1. In Step S2, as one example, whether or not the slip degree SL1 has exceeded the predetermined slip threshold SH is determined.

The slip degree is an index indicating the degree of the slip of the wheel 2a with respect to the rail R. For example, the slip degree may be defined as the slip ratio that is a value obtained by dividing a value, obtained by subtracting the wheelset speed from the ground speed (railcar speed), by the ground speed. Or, the slip degree may be defined as the deceleration of the wheelset 2. Or, both the slip ratio that is a value obtained by dividing a value, obtained by subtracting the wheelset speed from the ground speed, by the ground speed and the deceleration of the wheelset 2 may be used as the slip degree.

According to the present embodiment, in Step S2, when at least one of a first slip condition that a slip ratio $SL1a$ that is a value obtained by dividing a value, obtained by subtracting the wheelset speed from the ground speed, by the ground speed exceeds a slip threshold SHa and a second slip condition that deceleration $SL1b$ (a value having an opposite sign (plus or minus) to acceleration) of the wheelset 2 exceeds a slip threshold SHb is established, it is determined that the slide slip control operation is being turned on. Here, the device configured to acquire the actual ground speed is not provided, so that when calculating the slip ratio $SL1a$, the estimated ground speed is used instead of the actual ground speed. To be specific, the slip ratio $SL1a$ is defined as a value obtained by dividing a value, obtained by subtracting the wheelset speed V from the estimated ground speed, by the estimated ground speed (hereinafter, a state where at least one of the first slip condition and the second slip condition is being established is referred to as a state where "the slip degree SL1 has exceeded the slip threshold SH").

As one example, the slide slip control portion 11 controls the electric brake device 4 so as to: make a target value of the braking torque smaller than an ordinary target value when the slip degree SL1 exceeds the slip threshold SH; and increase the braking torque to the ordinary target value when the slip degree SL1 is less than the slip threshold SH1. Thus, the slide slip control portion 11 adjusts the braking torque to suppress the slip of the wheel 2a (for example, SH≥SH1). For example, as shown in FIG. 6, when the wheelset speed V separates from the ground speed, and the slip degree SL1 exceeds the slip threshold SH (time t1), the braking torque of the electric brake device 4 is reduced, and the wheelset speed V gets close to the ground speed. After that, when the slip degree SL1 becomes less than the slip threshold SH1 (time t2), the target value of the braking torque of the electric brake device 4 is returned to the ordinary target value. When calculating the slip ratio $SL1a$, the estimated ground speed (FIG. 4) is used instead of the actual ground speed. Therefore, if the wheelset speed V does not largely separate from the actual ground speed (shown by the two-dot chain line in FIG. 6), a difference from the estimated ground speed is not adequately generated, and the reduction of the braking torque is not started by the slide slip control portion 11.

When it is determined in Step S2 that the slide slip control operation is being turned on, the forced switching condition determining portion 18 determines, concurrently with the above slide slip control operation, whether or not the wheelset speed V has exceeded the forced switching threshold P4 (Step S3). When it is determined that the wheelset speed V has not exceeded the forced switching threshold P4, the brake switching portion 13 forcibly performs the switching from the operation of the electric brake device 4 to the operation of the air brake device 5 (Step S11). When it is determined that the wheelset speed V has exceeded the forced switching threshold P4, the braking torque reduction condition determining portion 16 determines whether or not the braking torque reduction condition that the wheelset speed V is less than the braking torque reduction threshold P1 is being established (Step S4). The braking torque reduction threshold P1 is preferably a value that is not less than 1.0 time and not more than 2.5 times the switching threshold P3, more preferably a value that is not less than 1.1 times and not more than 2.0 times the switching threshold P3. With this, whether or not the braking torque reduction condition is being established can be determined in a state where the wheelset speed V is close to the switching threshold P3.

When it is determined that the braking torque reduction condition is not being established, the process returns to Step S4. When it is determined that the braking torque reduction condition is being established, the forced switching condition determining portion 18 determines whether or not the wheelset speed V has exceeded the forced switching threshold P4 (Step S5). When it is determined that the wheelset speed V has not exceeded the forced switching threshold P4, the brake switching portion 13 forcibly performs the switching from the operation of the electric brake device 4 to the operation of the air brake device 5 (Step S11). When it is determined that the wheelset speed V is less than the braking torque reduction threshold P1 and has exceeded the forced switching threshold P4, the braking torque reduction condition determining portion 16 determines whether or not the slip degree SL1 is the slip threshold SH or more (Step S6).

When it is determined that the slip degree SL1 is the slip threshold SH or more, the braking torque control portion 17 makes the target value of the braking torque of the electric brake device 4 smaller than the ordinary target value (Step S7). For example, as shown in FIG. 6, when the wheelset speed V decreases from a value larger than the braking torque reduction threshold P1 to become less than the braking torque reduction threshold P1 (time t3), the braking torque of the electric brake device 4 is reduced, and the wheelset speed V gets close to the ground speed. When it is determined that the slip degree SL1 is not the slip threshold SH or more, it is determined that satisfactory braking is being realized by the slide slip control operation, and the process does not proceed to Step S7 but returns to Step S5 for improving braking efficiency.

After Step S7, the switching permission condition determining portion 14 determines whether or not the first condition that the wheel 2a is in the predetermined adhesion state with respect to the rail R is being established (Step S8). This predetermined adhesion state denotes a state where the slip degree SL1 of the wheel 2a with respect to the rail R is smaller than at least a slip degree corresponding to the adhesion limit. As shown in FIG. 6, in the present embodiment, when a change in a change rate (acceleration) of the wheelset speed V (adhesion monitoring speed) from a positive value to a negative value is detected (time t4) while the railcar 1 is decelerating by the braking command, the switching permission condition determining portion 14 determines that the wheel 2a is in the predetermined adhesion state.

When it is determined that the first condition that the wheel 2a is in the predetermined adhesion state is not being established, the process returns to Step S5. To be specific, since the first condition is not being established, the switching permission condition determining portion 14 determines that the switching permission condition is not being established, and the switching permission condition determining portion 14 causes the setting portion 15 to set the not-permitting state of not permitting the switching performed by the brake switching portion 13 when the switching condition is being established (for example, invalidating a switching permission flag). When it is determined that the first condition that the wheel 2a is in the predetermined adhesion state is being established, the switching permission condition determining portion 14 determines whether or not the second condition that the value VD obtained by subtracting the switching threshold P3 from the wheelset speed V is less than the permission threshold P2 is being established (Step S9).

The permission threshold P2 is preferably a value that is not less than 0.01 time and not more than 1.5 times the switching threshold P3, more preferably a value that is not less than 0.05 time and not more than 1.0 time the switching threshold P3. With this, when the second condition is established, the wheelset speed V can quickly reach the switching threshold P3 after the establishment of the first condition. It should be noted that in Step S9, the second condition is a condition that the value VD obtained by subtracting the switching threshold P3 from the wheelset speed V is less than the permission threshold P2. However, the second condition may be paraphrased as a condition that the wheelset speed V is less than a predetermined threshold (for example, P2+P3).

When it is determined that the second condition that the value VD is less than the permission threshold P2 is not being established, the process returns to Step S3. To be specific, since the second condition is not being established, the switching permission condition determining portion 14 determines that the switching permission condition is not being established, and the switching permission condition determining portion 14 causes the setting portion 15 to set the not-permitting state of not permitting the switching performed by the brake switching portion 13 when the switching condition is being established (for example, invalidating the switching permission flag).

When it is determined that the second condition that the value VD is less than the permission threshold P2 is being established, the switching permission condition determining portion 14 determines that the switching permission condition is being established since both the first condition and the second condition are being established, and the switching permission condition determining portion 14 causes the setting portion 15 to set the permitting state of permitting the switching performed by the brake switching portion 13 when the switching condition is being established (for example, validating the switching permission flag). After that, the switching condition determining portion 12 determines whether or not the switching condition that the wheelset speed V (switching monitoring speed) is less than the predetermined switching threshold P3 is being established (Step S10). When it is determined that the switching condition that the wheelset speed V is less than the predetermined switching threshold P3 is not being established, the process returns to Step S10. When it is determined that the switching condition that the wheelset speed V is less than the predetermined switching threshold P3 is being established, the brake switching portion 13 performs the switching from the operation of the electric brake device 4 to the operation of the air brake device 5 (Step S11).

As shown in FIG. 6, in the present embodiment, when the switching condition determining portion 12 determines that the switching condition is being established (time t5), the brake switching portion 13 outputs a command of starting the operation of the air brake device 5. Further, after a predetermined delay time Δt from the above determination, the brake switching portion 13 outputs a command of terminating the operation of the electric brake device 4. To be specific, in a period from when the command of starting the operation of the air brake device 5 is output and the generation of the braking force by the air brake device 5 starts (time t5) until when the generation of the braking force by the electric brake device 4 terminates (time t6), the operation of the electric brake device 4 and the operation of the air brake device 5 overlap, and both the braking force by the electric brake device 4 and the braking force by the air brake device 5 act. Therefore, in this period (period from the time t5 until the time t6), the braking force applied to the wheel 2a momentarily increases. However, since the switching permission condition is being established (Steps S8 and S9), the slip degree of the wheel 2a may be in the vicinity of the adhesion limit or smaller than the adhesion limit when the generation of the braking force by the air brake device 5 starts (time t5). Thus, the wheel 2a is not locked, and the actual ground speed quickly becomes zero.

According to the above-explained configuration, the electric brake device 4 and the brake switching portion 13 are controlled such that the wheel 2a adheres to the rail R at the time of the switching performed by the brake switching portion 13 when the switching condition is being established. Therefore, it is possible to prevent a case where the slip is promoted by the switching from the operation of the electric brake device 4 to the operation of the air brake device 5. On this account, the increase in the slip by the brake switching can be prevented, and the braking distance can be shortened.

Specifically, when the braking torque reduction condition that the wheelset speed V is less than the braking torque reduction threshold P1 that is slightly larger than the switching threshold P3 is established, that is, when the wheel set speed V is close to the switching threshold P3, the braking torque of the electric brake device 4 is reduced. Therefore, the wheel 2a can be cause to become the adhesion state at the time of the brake switching.

Further, when the switching permission condition including the condition that the wheel 2a is in the predetermined adhesion state with respect to the rail R is not being established, the not-permitting state of not permitting the switching performed by the brake switching portion 13 when the switching condition is being established is set. Therefore, it is possible to prevent a case where the slip is promoted by the switching from the operation of the electric brake device 4 to the operation of the air brake device 5 when the wheel 2a is not in the predetermined adhesion state. Further, when the switching permission condition is established, the permitting state of permitting the switching performed by the brake switching portion 13 when the switching condition is being established is set. Therefore, when the wheel 2a is in the predetermined adhesion state, the switching from the operation of the electric brake device 4 to the operation of the air brake device 5 can be quickly performed, and the wheel 2a can be quickly stopped.

Further, when the change rate (acceleration) of the wheelset speed V changes from the positive value to the negative value (time t4), it is determined that the wheel 2a is in the predetermined adhesion state. Therefore, information of the ground speed is unnecessary for the determination of the adhesion state, and it becomes unnecessary to mount on the railcar 1 the device configured to measure the actual ground speed. Furthermore, the switching permission condition also includes the condition that the value VD obtained by subtracting the switching threshold P3 from the wheelset speed V is less than the permission threshold P2. Therefore, the period from when the switching permission condition is established (time t4) until when the switching condition is established (time t5) becomes short, and it is possible to prevent a case where the slip degree exceeds the adhesion limit in this period.

When the forced switching condition that the wheelset speed V is less than the forced switching threshold P4 that is smaller than the switching threshold P3 is established, the brake switching is forcibly performed even in a case where the not-permitting state is being set by the setting portion 15. Therefore, it is possible to surely prevent a case where the switching from the operation of the electric brake device 4 to the operation of the air brake device 5 cannot be performed when the braking torque by the electric brake device 4 becomes low since the ground speed reaches the low speed range.

Embodiment 2

Figure 7:
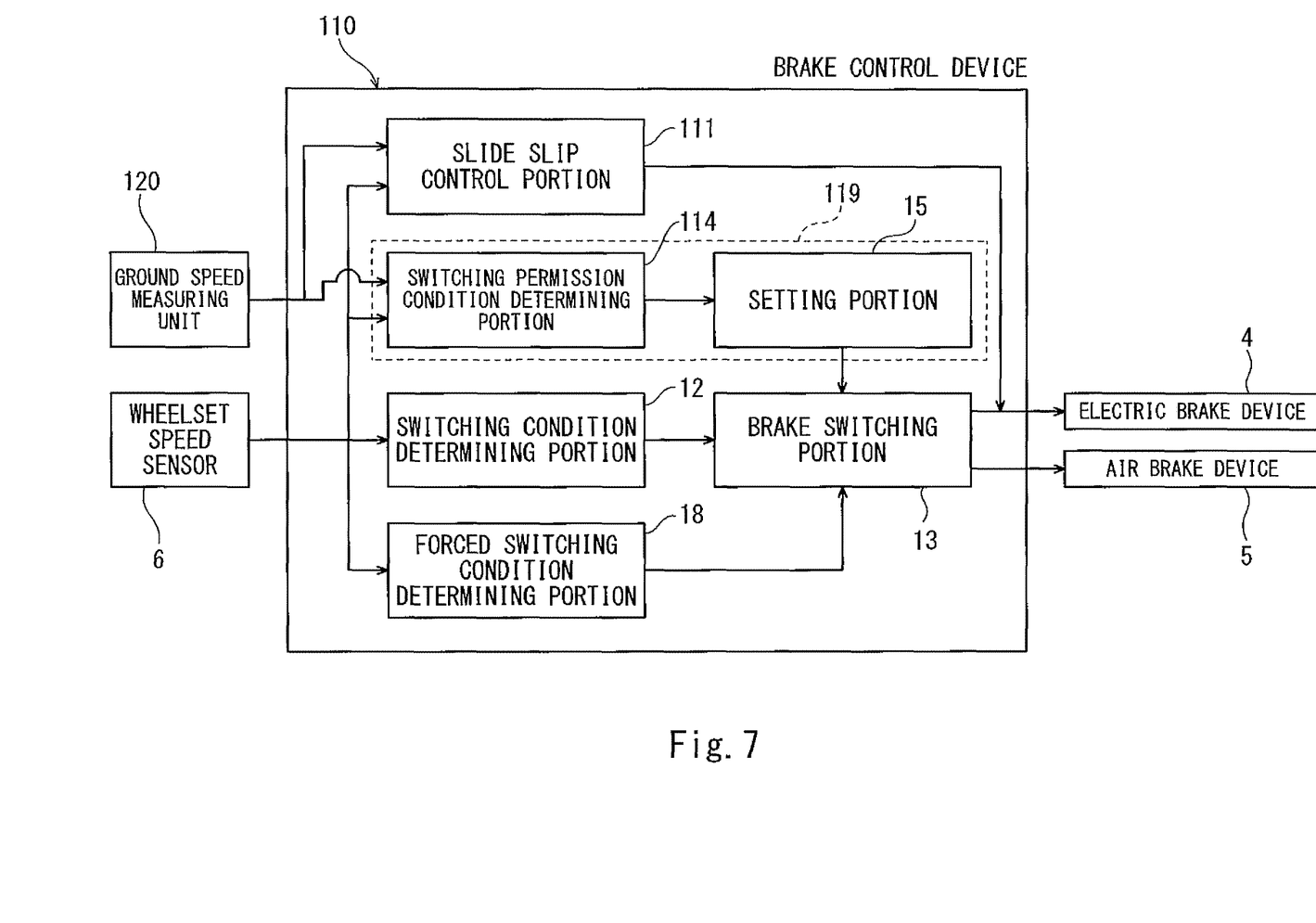
FIG. 7 is a block diagram of the brake control device according to Embodiment 2.

FIG. 7 is a block diagram of a brake control device 110 according to Embodiment 2. The same reference signs are used for the same components as Embodiment 1, and detailed explanations thereof are omitted. As shown in FIG. 7, the railcar of the present embodiment includes a ground speed measuring unit 120 configured to measure the actual ground speed that is the travelling speed of the railcar. Various known means can be used as the ground speed measuring unit 120 as long as the ground speed measuring unit 120 can acquire the travelling speed of the railcar without being influenced by the slip of the wheel 2a. For example, the ground speed measuring unit 120 may differentiate time series data of railcar positional information, obtained from a GPS, to calculate the ground speed. Or, the ground speed measuring unit 120 may integrate time series data of acceleration information, obtained from an acceleration sensor mounted on the railcar, to calculate the ground speed.

The brake control device 110 includes a slide slip control portion 111, the switching condition determining portion 12, the brake switching portion 13, a switching permission condition determining portion 114, the setting portion 15, and the forced switching condition determining portion 18. When a slip degree SL2 exceeds the predetermined slip threshold SH, the slide slip control portion 111 starts the braking force reducing control operation of reducing the braking force of the electric brake device 4 or the braking force of the air brake device 5. When the slip degree SL2 becomes less than the predetermined slip threshold SH1, the slide slip control portion 111 terminates the braking force reducing control operation. In the present embodiment, the ground speed measuring unit 120 is provided at the railcar. Therefore, when calculating a slip ratio SL2a as the slip degree SL2, the estimated ground speed is not used, but the actual ground speed is used. To be specific, the slip ratio SL2a is defined as a value obtained by dividing a value, obtained by subtracting the wheelset speed V from the ground speed, by the ground speed.

The switching permission condition determining portion 114 determines whether or not the switching permission condition that the wheel 2a is in the predetermined adhesion state with respect to the rail R is being established. When the slip degree SL2 of the wheel 2a with respect to the rail R is less than the slip threshold SH, the switching permission condition determining portion 114 determines that the wheel 2a is in the adhesion state with respect to the rail R. It should be noted that the switching condition determining portion 12, the brake switching portion 13, the setting portion 15, and the forced switching condition determining portion 18 are the same as those of Embodiment 1. To be specific, the switching permission condition determining portion 114 and the setting portion constitute an adhesion control portion 119. The adhesion control portion 119 controls the brake switching portion 13 such that the wheel 2a adheres to the rail R at the time of the switching performed by the brake switching portion 13 when the switching condition is being established.

Figure 8:
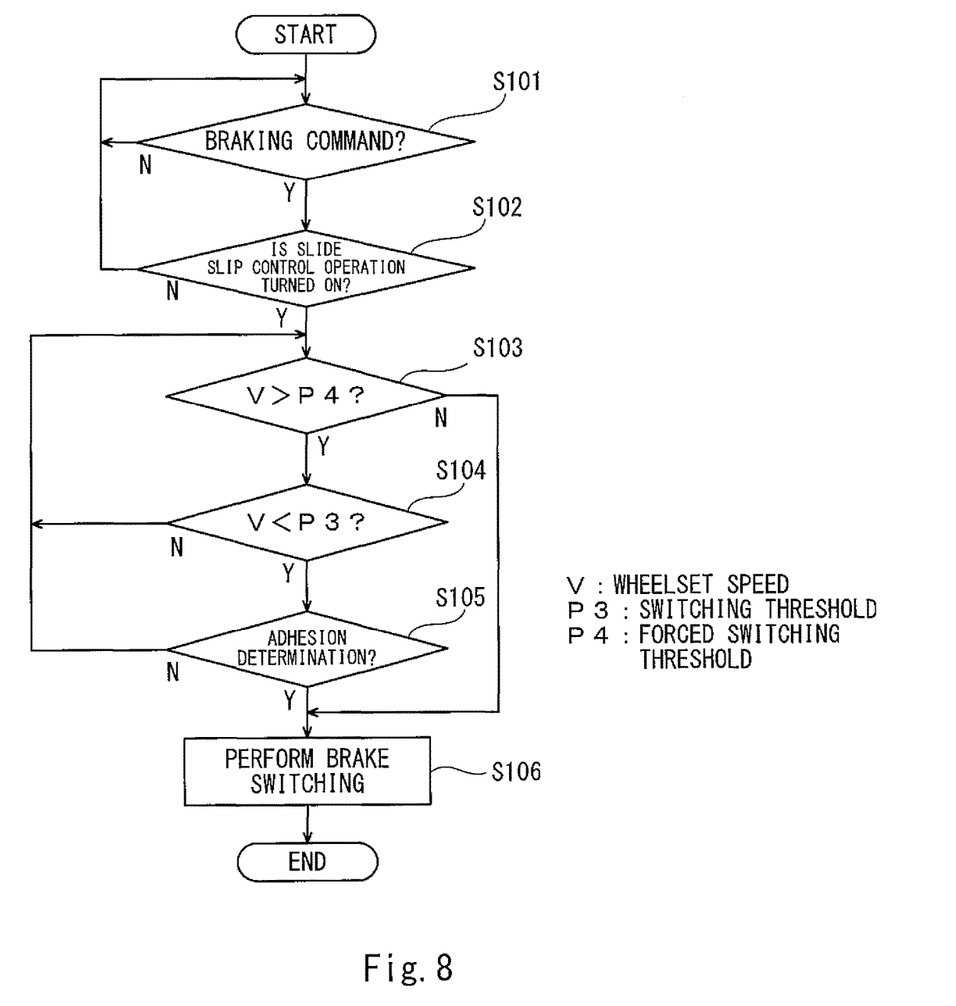
FIG. 8 is a flow chart for explaining the control operation of the brake control device shown in FIG. 7.
Figure 9:
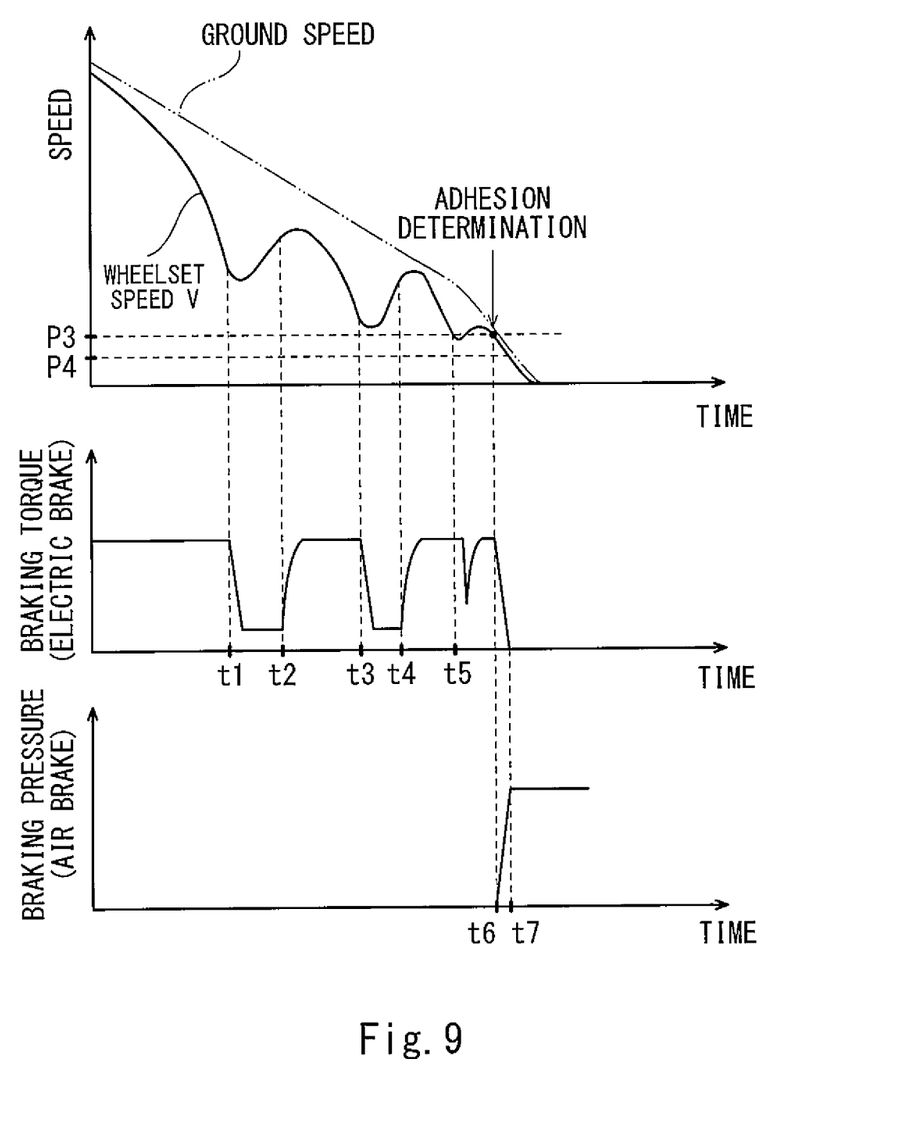
FIG. 9 shows timing charts of the wheelset speed, the braking torque of an electric brake device, and the braking pressure of an air brake device at the time of the control operation of the brake control device shown in FIG. 7.

FIG. 8 is a flow chart for explaining the control operation of the brake control device 110 shown in FIG. 7. FIG. 9 shows timing charts of the wheelset speed V, the braking torque of the electric brake device 4, and the braking pressure of the air brake device 5 at the time of the control operation of the brake control device 110 shown in FIG. 7. In FIG. 9, a solid line indicates the wheelset speed V (switching monitoring speed) of the wheelset 2 whose wheelset speed is the highest among the plurality of wheelsets 2. Hereinafter, control details of the brake control device 110 will be explained based on the flow chart of FIG. 8 while referring to FIGS. 7 and 9.

The brake control device 110 determines whether or not the braking command from the driver is being received (Step S101). When it is determined that the braking command is not being received, the process returns to Step S101. When it is determined that the braking command is being received, the brake control device 110 determines whether or not the slide slip control operation is being turned on (Step S102). As one example, in Step S102, whether or not the slip degree SL2 has exceeded the slip threshold SH is determined. When it is determined that the slide slip control operation is not being turned on, the process returns to Step S101. When it is determined that the slide slip control operation is being turned on, the slide slip control operation is executed by the slide slip control portion 111 (Step S103).

As one example, the slide slip control portion 111 controls the electric brake device 4 so as to: make the target value of the braking torque smaller than the ordinary target value when the slip degree SL2 exceeds the slip threshold SH; and increase the braking torque to the ordinary target value when the slip degree SL2 does not exceed the slip threshold SH1. Thus, the slide slip control portion 111 adjusts the braking torque to suppress the slip of the wheel 2a (for example, SH≥SH1). For example, as shown in FIG. 9, when the wheelset speed V separates from the ground speed, and the slip degree SL2 exceeds the slip threshold SH (times t1 and t3), the braking torque of the electric brake device 4 is reduced, and the wheelset speed V gets close to the ground speed. After that, when the slip degree SL2 becomes less than the slip threshold SH1 (times t2 and t4), the target value of the braking torque of the electric brake device 4 is returned to the ordinary target value. When calculating the slip ratio SL2a as the slip degree SL2, the estimated ground speed is not used, but the actual ground speed is used. Therefore, even when the separation of the wheelset speed V from the actual ground speed (shown by a two-dot chain line in FIG. 9) is not larger than that of FIG. 6, the reduction of the braking torque by the slide slip control portion 111 is started.

When it is determined in Step S102 that the slide slip control operation is being turned on, the forced switching condition determining portion 18 determines, concurrently with the above slide slip control operation, whether or not the wheelset speed V has exceeded the forced switching threshold P4 (Step S103). When it is determined that the wheelset speed V has not exceeded the forced switching threshold P4, the brake switching portion 13 forcibly performs the switching from the operation of the electric brake device 4 to the operation of the air brake device 5 (Step S106). When it is determined that the wheelset speed V has exceeded the forced switching threshold P4, the switching condition determining portion 12 determines whether or not the switching condition that the wheelset speed V (switching monitoring speed) is less than the switching threshold P3 is being established (Step S104). When it is determined that the switching condition that the wheelset speed V is less than the predetermined switching threshold P3 is not being established, the process returns to Step S103.

When it is determined that the switching condition that the wheelset speed V is less than the predetermined switching threshold P3 is being established (time t5), the switching permission condition determining portion 114 determines whether or not the switching permission condition that the wheel 2a is in the predetermined adhesion state with respect to the rail R is being established (Step S105). The predetermined adhesion state denotes a state where the slip ratio SL2a of the wheel 2a with respect to the rail R is smaller than at least a slip ratio corresponding to the adhesion limit. Specifically, the switching permission condition is a condition that the slip ratio SL2a is less than a predetermined slip threshold SH1a.

In a case where the slip ratio SL2a is less than the slip threshold SH1a when it is determined that the switching condition is being established, the brake switching portion 13 performs the switching from the operation of the electric brake device 4 to the operation of the air brake device 5 (Step S106). FIG. 9 shows an example in which the slip ratio SL2a is not less than the slip threshold SH1a when it is determined that the switching condition is being established (time t5). Therefore, the process returns to Step S103. To be specific, since the slip ratio SL2a is not less than the slip threshold SH1a, the switching permission condition determining portion 114 determines that the switching permission condition is not being established, and the switching permission condition determining portion 114 causes the setting portion 15 to set the not-permitting state of not permitting the switching performed by the brake switching portion 13 when the switching condition is being established (for example, invalidating the switching permission flag).

After that, at the time t6 in FIG. 9, it is determined that: the wheelset speed V has exceeded the forced switching threshold P4 (Step S103); the switching condition that the wheelset speed V is less than the predetermined switching threshold P3 is being established (Step S104); and the slip ratio SL2a is less than the slip threshold SH1a, and the switching permission condition is being established (Step S105). Therefore, the setting portion 15 sets the permitting state of permitting the switching performed by the brake switching portion 13 when the switching condition is being established (for example, validating the switching permission flag), and the brake switching portion 13 performs the switching from the operation of the electric brake device 4 to the operation of the air brake device 5 (Step S106).

Specifically, as shown in FIG. 9, at the time t6, the brake switching portion 13 outputs a command of terminating the operation of the electric brake device 4 and also outputs a command of starting the operation of the air brake device 5. In a period from when the command of terminating the operation of the electric brake device 4 is output (time t6) until when the generation of the braking force by the electric brake device 4 is terminated (time t7), the operation of the electric brake device 4 and the operation of the air brake device 5 overlap, and both the braking force by the electric brake device 4 and the braking force by the air brake device 5 act. Therefore, in this period (period from the time t6 until the time t7), the braking force applied to the wheel 2a momentarily increases. However, since the switching permission condition is being established (Step S105), the slip ratio of the wheel 2a is smaller than the adhesion limit when the generation of the braking force by the air brake device 5 starts (time t6). Thus, the wheel 2a is not locked, and the actual ground speed quickly becomes zero.

According to the above-explained configuration, as with Embodiment 1, the increase in the slip by the brake switching can be prevented, and the braking distance can be shortened. Further, when the switching condition that the wheelset speed V is less than the predetermined switching threshold P3 is established, the switching permission condition is determined. Therefore, it is possible to easily secure a state where the axle 2b is in the adhesion state when the brake switching portion 13 performs the switching from the operation of the electric brake device 4 to the operation of the air brake device 5.

The present invention is not limited to the above embodiments, and modifications, additions, and eliminations may be made within the scope of the present invention. The above embodiments may be combined arbitrarily. For example, a part of components or methods in one embodiment may be applied to another embodiment. In the above embodiments, the switching monitoring speed and the adhesion monitoring speed are the same as each other (i.e., each of these speeds is the wheelset speed V) but may be different from each other. For example, in the above embodiments, the switching monitoring speed which is compared with the braking torque reduction threshold P1, the permission threshold P2, the switching threshold P3, or the forced switching threshold P4 is the wheelset speed V of the wheelset 2 whose wheelset speed is the highest among the plurality of wheelsets 2. However, the switching monitoring speed may be the wheelset speed of the wheelset whose wheelset speed is not the highest or may be the estimated ground speed. To be specific, the switching monitoring speed may be the wheelset speed itself or may be a parameter which changes in accordance with the wheelset speed. Further, in Step S8, the adhesion monitoring speed for performing an adhesion determination is the wheelset speed V of the wheelset 2 whose wheelset speed is the highest among the plurality of wheelsets 2. However, the adhesion monitoring speed may be the wheelset speed of the wheelset whose wheelset speed is not the highest or may be the estimated ground speed. To be specific, the adhesion monitoring speed may be the wheelset speed itself or may be a parameter which changes in accordance with the wheelset speed.

Further, in Step S8 of Embodiment 1, when the change in the change rate (acceleration) of the wheelset speed V from the positive value to the negative value is detected, it is determined that the wheel 2a is in the predetermined adhesion state with respect to the rail R. However, the ground speed measuring unit may be provided, and in Step S8, when it is detected that the slip ratio is less than the predetermined slip threshold, it may be determined that the wheel 2a is in the predetermined adhesion state with respect to the rail R. Further, Embodiment 1 may be modified such that: the switching permission condition determining portion 14 and the setting portion 15 are omitted; and Steps S8 and S9 in the flow chart of FIG. 5 are omitted. To be specific, the flow chart of FIG. 5 may be such that: after the braking torque control portion 17 makes the target value of the braking torque of the electric brake device 4 smaller than the ordinary target value (Step S7), the permission determination (Steps S8 and S9) of the brake switching is not performed; and when the switching condition that the wheelset speed V is less than the switching threshold P3 is established (Step S10), the brake switching is performed (Step S11).

REFERENCE SIGNS LIST 1 railcar
2 wheelset
2a wheel
4 electric brake device
5 air brake device
10, 110 brake control device
13 brake switching portion
14, 114 switching permission condition determining portion
15 setting portion
16 braking torque reduction condition determining portion
17 braking torque control portion
18 forced switching condition determining portion
19 adhesion control portion

The invention claimed is:

1. A brake control device of a railcar, the brake control device being a device configured to control an electric brake device and mechanical brake device of the railcar, the brake control device comprising:
a brake switching portion configured to perform switching from an operation of the electric brake device to an operation of the mechanical brake device when a switching monitoring speed obtained from a wheelset speed becomes less than a switching threshold; and
an adhesion control portion configured to, when the brake switching portion performs the switching, control at least one of the electric brake device and the brake switching portion to cause a wheel to adhere to a rail, wherein
the adhesion control portion includes a setting portion configured to:
when a switching permission condition including a condition that the wheel is in a predetermined adhesion state with respect to the rail is established, set a permitting state of permitting the switching performed by the brake switching portion, and
when the switching permission condition is not established, set a not-permitting state of not permitting the switching performed by the brake switching portion.

2. The brake control device according to claim 1, wherein the adhesion control portion includes a braking torque control portion configured to reduce braking torque of the electric brake device when the switching monitoring speed becomes less than a braking torque reduction threshold that is larger than the switching threshold.

3. The brake control device according to claim 1, wherein the switching permission condition further includes a condition that a value obtained by subtracting the switching threshold from the switching monitoring speed is less than a permission threshold.

4. The brake control device according to claim 1, wherein when a change rate of an adhesion monitoring speed obtained from the wheelset speed changes from a positive value to a negative value while the railcar is decelerating, it is determined that the wheel is in the adhesion state with respect to the rail.

5. The brake control device according to claim 1, wherein whether or not the wheel is in the adhesion state with respect to the rail is determined by comparing a slip degree of the wheel with respect to the rail with a slip threshold.

6. The brake control device according to claim 1, wherein when the switching monitoring speed is less than a forced switching threshold that is smaller than the switching threshold, the brake switching portion forcibly performs the switching from the operation of the electric brake device to the operation of the mechanical brake device even in a case where the not-permitting state is being set by the setting portion.

* * * * *